(12) United States Patent
Nagase et al.

(10) Patent No.: US 12,006,049 B2
(45) Date of Patent: Jun. 11, 2024

(54) FLYING BODY

(71) Applicant: Panasonic Intellectual Property Management Co., Ltd., Osaka (JP)

(72) Inventors: Ryosuke Nagase, Osaka (JP); Masaya Ugaji, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 101 days.

(21) Appl. No.: 17/757,439

(22) PCT Filed: Nov. 19, 2020

(86) PCT No.: PCT/JP2020/043099
§ 371 (c)(1),
(2) Date: Jun. 15, 2022

(87) PCT Pub. No.: WO2021/131427
PCT Pub. Date: Jul. 1, 2021

(65) Prior Publication Data
US 2023/0014461 A1    Jan. 19, 2023

(30) Foreign Application Priority Data
Dec. 25, 2019   (JP) .................................. 2019-234231

(51) Int. Cl.
*B64D 27/24* (2006.01)
*B64C 27/08* (2023.01)
(52) U.S. Cl.
CPC .............. *B64D 27/24* (2013.01); *B64C 27/08* (2013.01)

(58) Field of Classification Search
CPC .... B64D 27/24; B64D 2221/00; B64C 27/08; B64C 27/10; Y02T 50/60; B64U 10/14;
(Continued)

(56) References Cited

U.S. PATENT DOCUMENTS 9,434,267 B2 *   9/2016   Wang ..................... B64D 27/24
9,446,842 B2 *   9/2016   Luyks ..................... B64C 27/12
(Continued)

FOREIGN PATENT DOCUMENTS

JP    2016-088110    5/2016
JP    2016-222031    12/2016
(Continued)

OTHER PUBLICATIONS

International Search Report of PCT application No. PCT/JP2020/043099 dated Dec. 22, 2020.

*Primary Examiner* — Medhat Badawi
(74) *Attorney, Agent, or Firm* — Rimon P.C.

(57) ABSTRACT

Flying body including body portion and a plurality of propellers radially disposed to be laterally symmetrical from body portion is provided with: a plurality of motors respectively rotating the plurality of propellers; a plurality of power storage packs respectively supplying currents to the plurality of motors; and sub power storage pack connected to the plurality of power storage packs by power wirings, respectively. The same number of motors of the plurality of motors are installed on each of the left and right sides, and the same number of power storage packs of the plurality of power storage packs are installed on each of the left and right sides. Sub power storage pack is installed on a lateral center line of body portion.

7 Claims, 8 Drawing Sheets

(58) Field of Classification Search
CPC ........ B64U 30/24; B64U 50/19; B64U 50/23; B64U 50/30; B64U 50/37
See application file for complete search history.

(56) References Cited

U.S. PATENT DOCUMENTS

| | | | |
|---|---|---|---|
| 9,643,729 B2* | 5/2017 | Walter-Robinson | H02P 4/00 |
| 9,764,837 B2* | 9/2017 | Phan | B64D 27/02 |
| 10,153,636 B1* | 12/2018 | Vander Lind | H02J 7/0013 |
| 11,097,839 B2* | 8/2021 | Sinha | B60L 53/00 |
| 11,594,779 B2* | 2/2023 | Schreiber | H01M 50/528 |
| 11,634,232 B1* | 4/2023 | Wiegman | B64D 27/24 |
| | | | 244/53 R |
| 11,639,230 B1* | 5/2023 | Wiegman | B64D 27/24 |
| | | | 244/55 |
| 11,655,024 B1* | 5/2023 | Yan | B60L 50/66 |
| | | | 320/107 |
| 11,738,874 B2* | 8/2023 | Becker | B64D 27/06 |
| | | | 244/55 |
| 2008/0184906 A1* | 8/2008 | Kejha | B64C 39/024 |
| | | | 102/374 |
| 2013/0147204 A1* | 6/2013 | Botti | F02B 63/04 |
| | | | 903/903 |
| 2015/0012154 A1* | 1/2015 | Senkel | B64C 25/56 |
| | | | 701/4 |
| 2015/0203200 A1* | 7/2015 | Bye | B64C 39/024 |
| | | | 244/58 |
| 2017/0066539 A1* | 3/2017 | van der Westhuizen | B64C 11/00 |
| 2017/0305548 A1* | 10/2017 | Ozaki | B64C 27/08 |
| 2017/0313433 A1* | 11/2017 | Ozaki | B64D 27/24 |
| 2018/0281947 A1* | 10/2018 | Sakai | B64C 39/024 |
| 2018/0339781 A1* | 11/2018 | Vander Lind | H01M 16/00 |
| 2023/0014461 A1* | 1/2023 | Nagase | B64U 10/14 |

FOREIGN PATENT DOCUMENTS

| | | |
|---|---|---|
| WO | 2016/189797 | 12/2016 |
| WO | 2018/217218 | 11/2018 |

* cited by examiner

FLYING BODY

TECHNICAL FIELD

The present invention relates to a flying body including a plurality of motors.

BACKGROUND ART

There may be a case where the following system is adopted. A plurality of battery packs are mounted on a flying body having a plurality of motors represented by a drone or the like (see PTL 1, for example), and the plurality of motors and the plurality of battery packs are connected to each other on a one-to-one basis. In such a case, irregularities occur in remaining capacity (state of charge (SOC)) among the plurality of battery packs due to irregularities in load among the plurality of motors. In this case, even when the SOCs of other battery packs are not 0% at a point of time that the SOC of one battery pack is 0%, the flying body cannot continue flying. That is, the energies of other battery packs cannot be effectively used. This means that an actual flight distance becomes shorter than a flyable distance that the flying body can originally fly with the whole energy of the plurality of battery packs.

Further, due to the irregularities in load among the plurality of motors, the irregularities also occur in charge/discharge rate and in depth of discharge among the plurality of battery packs. Accordingly, irregularities occur also in the degree of progress of a deterioration state (state of health: SOH). The full charge capacity (FCC) of the battery pack where the SOH is lowered becomes smaller than the FCCs of other battery packs. Accordingly, the decrease of the flyable distance is further accelerated.

CITATION LIST

Patent Literature

PTL 1: Unexamined Japanese Patent Publication No. 2016-222031

SUMMARY OF THE INVENTION

The present disclosure has been made in view of such circumstances, and it is an object of the present disclosure to provide a technique for effectively utilizing capacities of a plurality of power storage packs mounted on a flying body while suppressing an effect on balance of a machine body.

In order to solve the above problem, a flying body according to an aspect of the present disclosure is a flying body including a body portion and a plurality of propellers radially disposed to be laterally symmetric from the body portion, and includes: a plurality of motors respectively rotating the plurality of propellers; a plurality of power storage packs respectively supplying currents to the plurality of motors; and a sub power storage pack connected to the plurality of power storage packs by power wirings, respectively. The same number of motors of the plurality of motors are installed on each of the left and right sides, the same number of power storage packs of the plurality of power storage packs are installed on each of the left and right sides, and the sub power storage pack is installed on a lateral center line of the body portion.

According to the present disclosure, it is possible to effectively utilize the capacities of the plurality of power storage packs mounted on the flying body while suppressing the effect on the balance of the machine body.

DESCRIPTION OF EMBODIMENT

Figure 1:
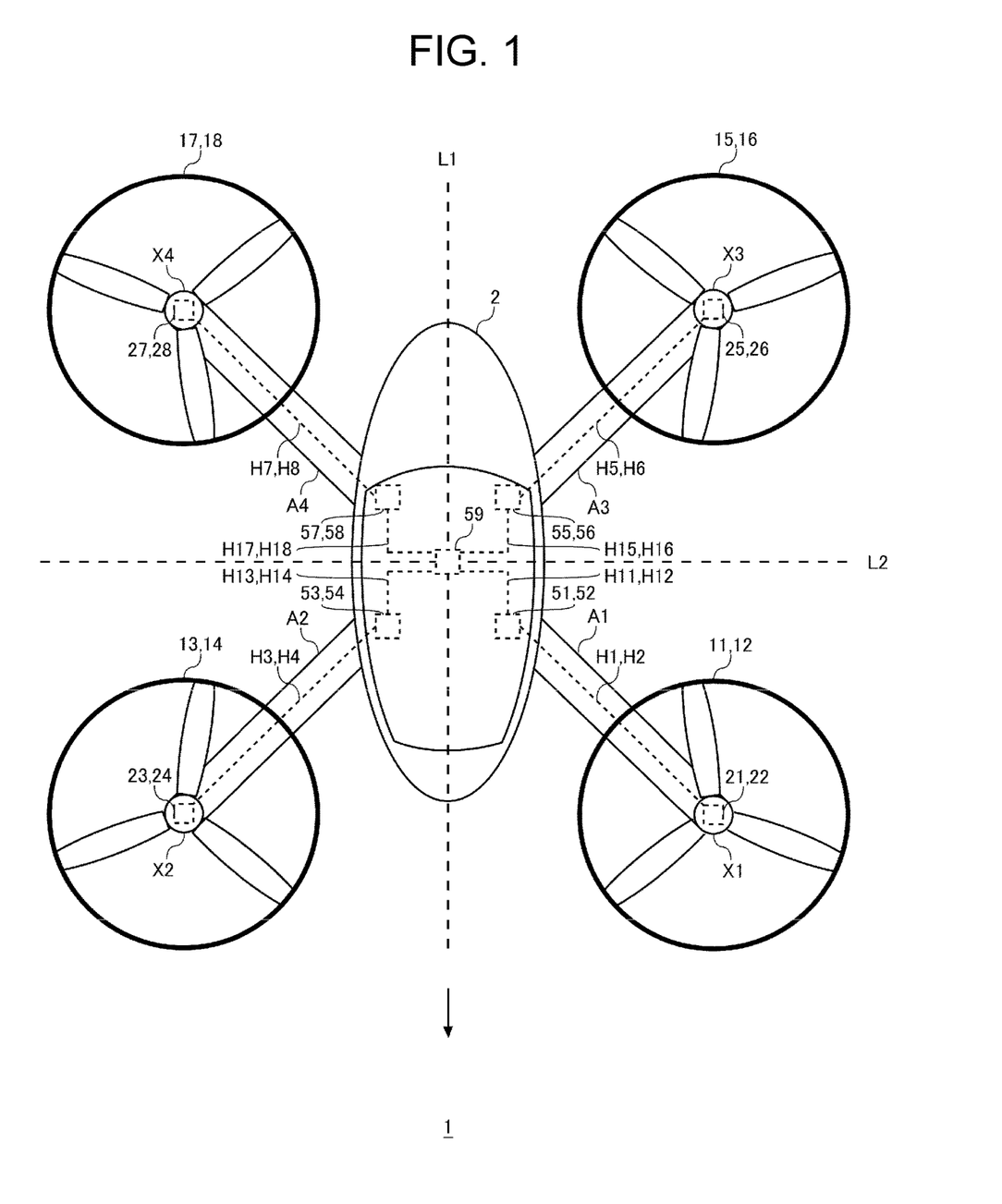
FIG. 1 is a schematic view of a flying body according to an exemplary embodiment as viewed from above.
Figure 2:
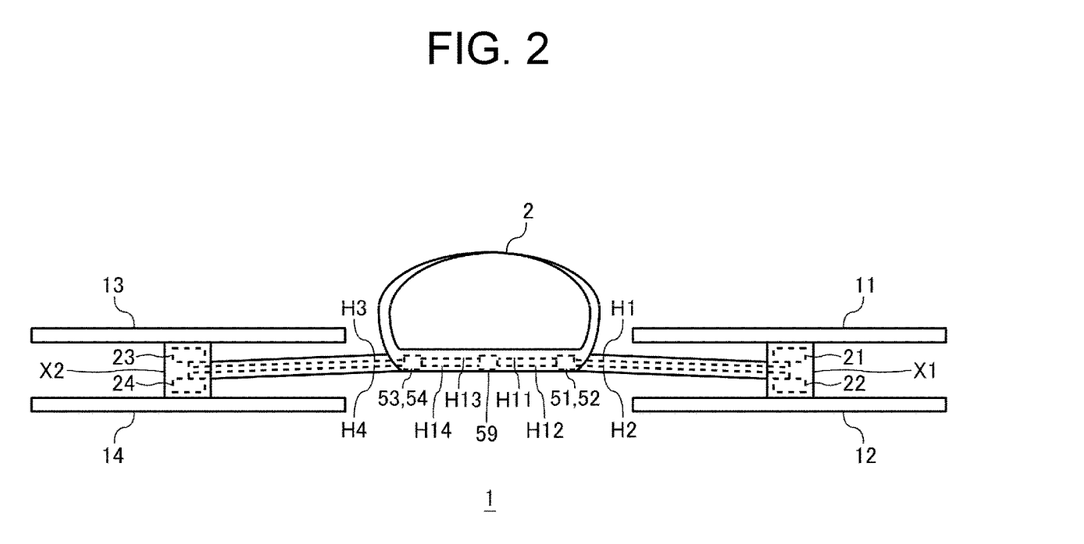
FIG. 2 is a schematic view of the flying body according to the exemplary embodiment as viewed from a front.

FIG. 1 is a schematic view of flying body 1 according to an exemplary embodiment as viewed from above. FIG. 2 is a schematic view of flying body 1 according to the exemplary embodiment as viewed from a front. Flying body 1 according to the exemplary embodiment is a multicopter called a flying vehicle or a manned drone. Flying body 1 according to the exemplary embodiment includes eight propellers 11 to 18. Four arms are diagonally installed to body portion 2, and two propellers are installed on upper and lower sides of a distal end of each arm in a vertical direction. As a result, flying body 1 has a configuration in which eight propellers 11 to 18 are radially disposed to be laterally symmetric from body portion 2.

First motor 21 for rotating first propeller 11 and second motor 22 for rotating second propeller 12 are installed in first support shaft X1 that supports first propeller 11 and second propeller 12. Similarly, third motor 23 and fourth motor 24 are installed in second support shaft X2 that supports third propeller 13 and fourth propeller 14, fifth motor 25 and sixth motor 26 are installed in third support shaft X3 that supports fifth propeller 15 and sixth propeller 16, and seventh motor 27 and eighth motor 28 are installed in fourth support shaft X4 that supports seventh propeller 17 and eighth propeller 18.

First power storage pack 51 for supplying a current to first motor 21 and second power storage pack 52 for supplying a current to second motor 22 are installed near the base on body portion 2 of first arm A1 connecting body portion 2 and first support shaft X1. Similarly, third power storage pack 53 and fourth power storage pack 54 are installed near the base on body portion 2 of second arm A2, fifth power storage pack 55 and sixth power storage pack 56 are installed near the base on body portion 2 of third arm A3, and seventh power storage pack 57 and eighth power storage pack 58 are installed near the base on body portion 2 of fourth arm A4.

First wire harness H1 connecting first motor 21 and first power storage pack 51 and second wire harness H2 connecting second motor 22 and second power storage pack 52 pass through first arm A1. Similarly, third wire harness H3 and fourth wire harness H4 pass through second arm A2, fifth wire harness H5 and sixth wire harness H6 pass through third arm A3, and seventh wire harness H7 and eighth wire harness H8 pass through fourth arm A4.

It is desirable to equalize wiring resistances of first wire harness H1 to eighth wire harness H8 in order to suppress irregularities in voltage drop due to the resistances of first wire harness H1 to eighth wire harness H8. Specifically, first propeller 11 to eighth propeller 18 and first power storage pack 51 to eighth power storage pack 58 are desirably connected respectively by first wire harness H1 to eighth wire harness H8 that have the same length and thickness.

In the present exemplary embodiment, sub power storage pack 59 is additionally installed in addition to first power storage pack 51 to eighth power storage pack 58. The role of sub power storage pack 59 will be described later. First to eighth power storage packs 51 to 58 are connected to sub power storage pack 59 by eleventh wire harness H11 to eighteenth wire harness H18, respectively.

Flying body 1 illustrated in FIG. 1 is designed such that a position of the center of gravity of flying body 1 is located at a center position of flying body 1 longitudinally and laterally. Unmanned multicopters used for aerial capturing, agrochemical spraying, and the like are often designed to be laterally symmetric and longitudinally symmetric. In this case, a position of the center of gravity and a center position of a machine body coincide with each other. In the case of a manned multicopter on which a person rides, a seat is required, and thus, it is difficult to design a machine body to be longitudinally symmetric.

The example illustrated in FIG. 1 is designed such that the center of gravity is located at an intersection (center point of flying body 1) between lateral center line L1 and longitudinal center line L2 of flying body 1 (body portion 2) by adjusting positions of seats and other mounted objects. Sub power storage pack 59 is installed in such a center-of-gravity portion. An installation position of sub power storage pack 59 in the up-down direction (vertical direction) is not particularly limited, but is desirably provided below a passenger. For example, it is desirable to install sub power storage pack 59 under a seat or under body portion 2.

It is desirable to equalize wiring resistances of eleventh wire harness H11 to eighteenth wire harness H18 in order to suppress irregularities in voltage drop due to the resistances of eleventh wire harness H11 to eighteenth wire harness H18.

When sub power storage pack 59 is installed in a central portion of the machine body (body portion 2) as illustrated in FIG. 1, distances from sub power storage pack 59 to first power storage pack 51 to eighth power storage pack 58 become equal, and the wirings have equal length naturally. That is, the wiring resistances can be made equal if sub power storage pack 59 is connected to first power storage pack 51 to eighth power storage pack 58 respectively by the same wire harness.

Figure 3:
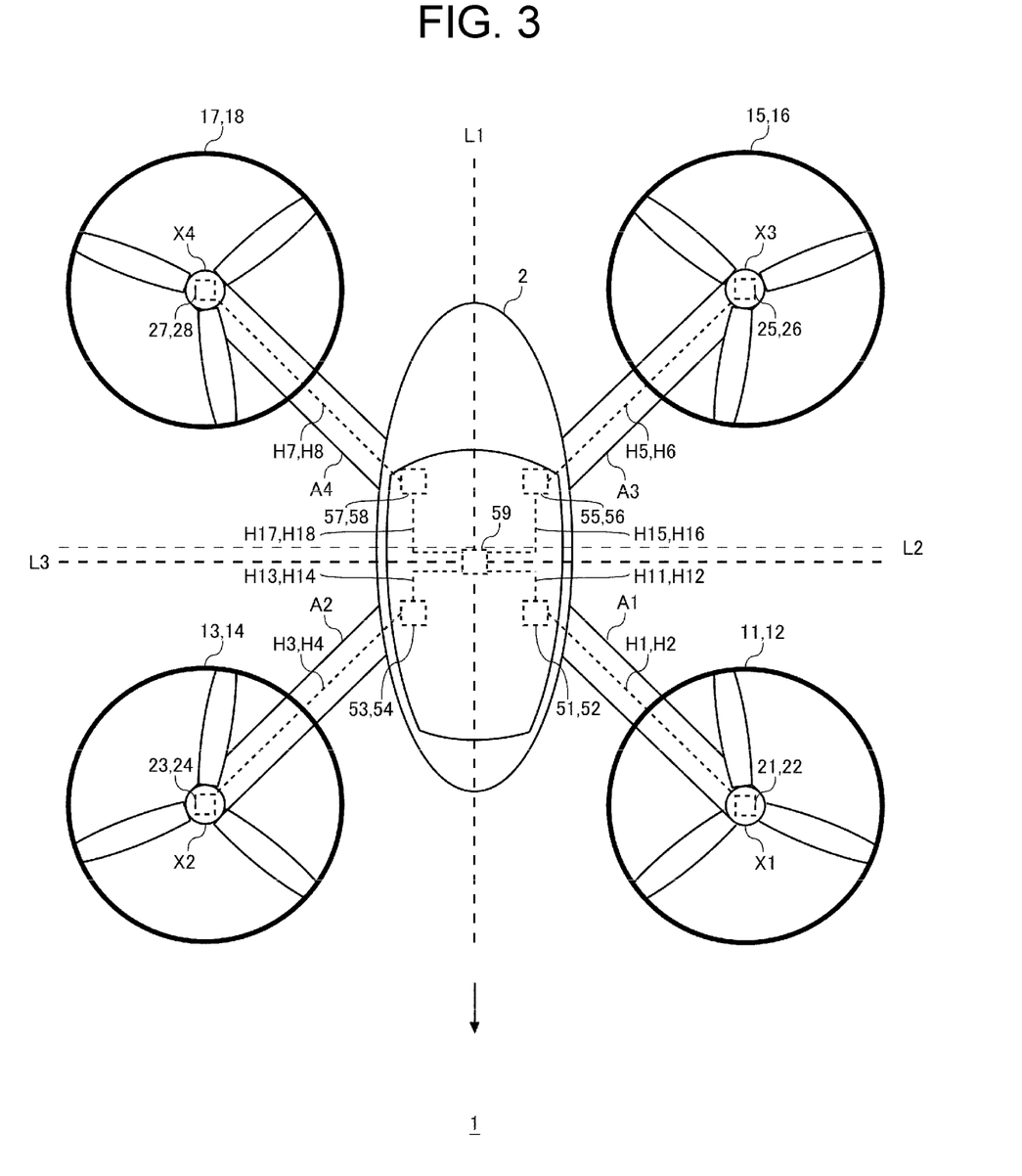
FIG. 3 is a schematic view of a flying body according to a modified example of the exemplary embodiment as viewed from above.

FIG. 3 is a schematic view of flying body 1 according to a modified example of the exemplary embodiment as viewed from above. Flying body 1 according to the modified example is designed such that a longitudinal position of the center of gravity is shifted forward from longitudinal center line L2. In the case of a manned multicopter, a direction of the front, which is an advancing direction, is fixed, and thus, the multicopter is often designed such that a position of the center of gravity center is located in front of a center position of lift. In this case, a nose-down moment acts, and the multicopter is easily accelerated in the advancing direction. Further, the stability of upward and downward movement of a nose is improved.

The example illustrated in FIG. 3 is designed such that the center of gravity is located at an intersection of lateral center line L1 of flying body 1 and line L3 sliding forward from longitudinal center line L2. Sub power storage pack 59 is installed in such a center-of-gravity portion.

In the example illustrated in FIG. 3, distances from sub power storage pack 59 to first power storage pack 51 to eighth power storage pack 58 are not equal. Even in such a state, sub power storage pack 59 is desirably connected to first power storage pack 51 to eighth power storage pack 58 respectively by eleventh wire harness H11 to eighteenth wire harness H18, respectively, such that the wiring resistances between sub power storage pack 59 and each of first power storage pack 51 to eighth power storage pack 58 become equal. When the same wire harness is used, eleventh wire harness H11 to fourteenth wire harness H14 connected to first power storage pack 51 to the fourth power storage pack 54 close to sub power storage pack 59 are loosely routed.

Further, wire harnesses of different model numbers may be used for each of eleventh wire harness H11 to fourteenth wire harness H14 connected to first power storage pack 51 to the fourth power storage pack 54 close to sub power storage pack 59, and each of fifteenth wire harness H15 to eighteenth wire harness H18 connected to the fifth power storage pack 55 to eighth power storage pack 58 far from sub power storage pack 59. For example, the wiring resistances of sub power storage pack 59 and each of first power storage pack 51 to eighth power storage pack 58 can be made substantially equal by using wire harnesses having different thicknesses.

Figure 4:
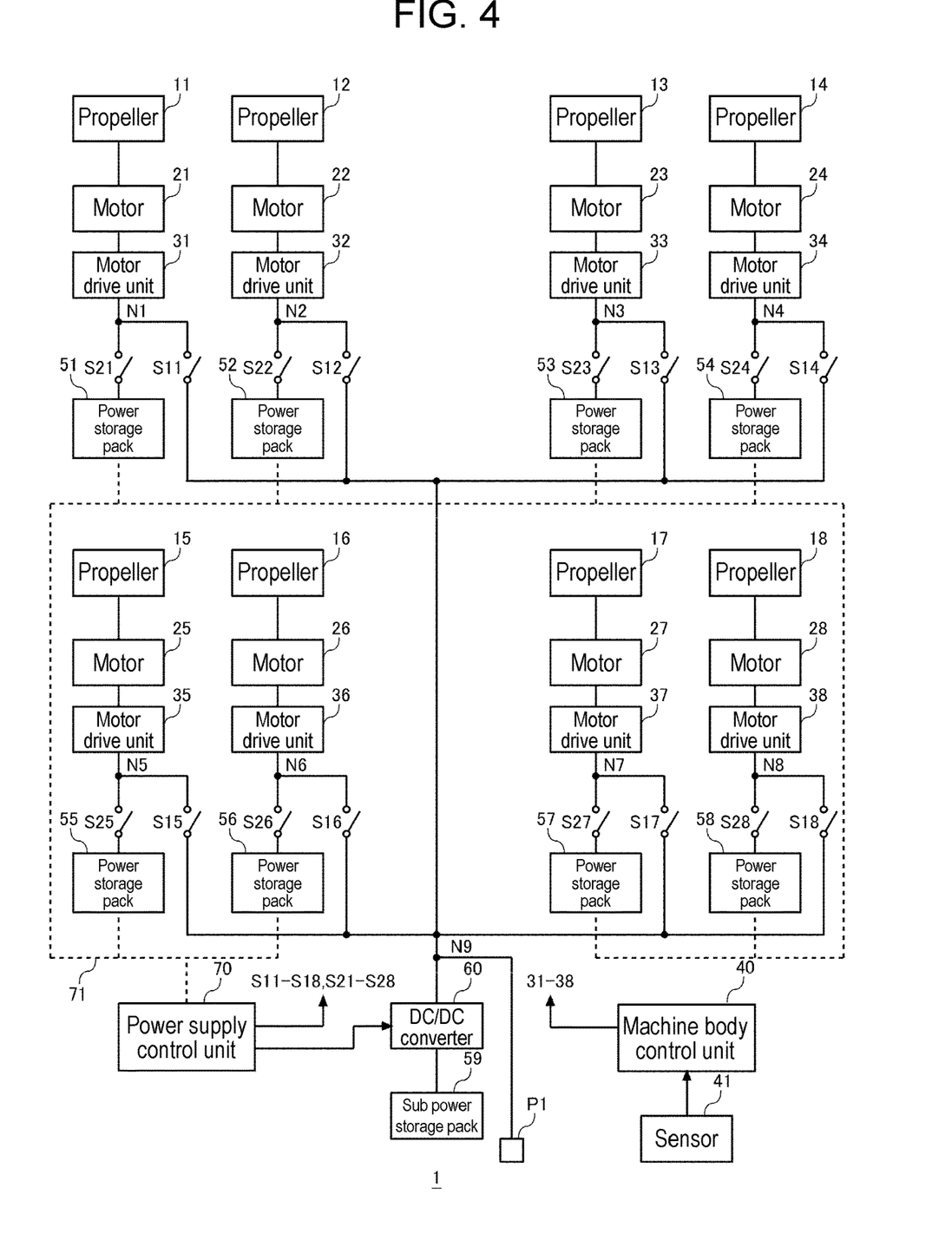
FIG. 4 is a functional block diagram of the flying body on which a power supply system according to the exemplary embodiment is mounted.

FIG. 4 is a functional block diagram of flying body 1 on which the power supply system according to the exemplary embodiment is mounted. Flying body 1 includes: eight propellers 11 to 18; eight motors 21 to 28; eight motor drive units 31 to 38; machine body control unit 40, sensor 41, and the power supply system.

Eight motors 21 to 28 are connected to rotary shafts of eight propellers 11 to 18, respectively. Eight motor drive units 31 to 38 drive eight motors 21 to 28, respectively. Eight motor drive units 31 to 38 include inverters, respectively. Each inverter converts a direct current supplied from each power storage pack into an alternating current corresponding to a command value designated by machine body control unit 40, and supplies the alternating current to each motor. Eight motors 21 to 28 respectively rotate eight propellers 11 to 18 at rotational speeds corresponding to alternating currents supplied from eight motor drive units 31 to 38, respectively.

Machine body control unit 40 may be configured using a microcomputer, and a nonvolatile memory (for example, electrically erasable programmable read-only memory (EEPROM) or a flash memory). Sensor 41 is a generic term for various sensors mounted on flying body 1. For example, as sensor 41, a gyro sensor, an acceleration sensor, an atmospheric pressure sensor, an ultrasonic wave sensor, a magnetic azimuth sensor, a global positioning system (GPS) sensor are mounted.

The gyro sensor detects an angular velocity of flying body 1, and outputs the angular velocity to machine body control unit 40. The acceleration sensor detects an acceleration of flying body 1, and outputs the acceleration to machine body control unit 40. Machine body control unit 40 estimates a posture and a speed of flying body 1 based on the inputted angular velocity and acceleration. The atmospheric pressure sensor detects an atmospheric pressure at a point at which flying body 1 is located, and outputs the atmospheric pressure to machine body control unit 40. The ultrasonic wave sensor receives a reflected wave of the emitted ultrasonic wave, and outputs the reflected wave to machine body control unit 40. Machine body control unit 40 estimates an altitude of flying body 1 based on the inputted atmospheric pressure and an ultrasonic reflection wave.

The magnetic azimuth sensor detects an azimuth based on geomagnetism, and outputs the detected azimuth to machine body control unit 40. Machine body control unit 40 estimates an advancing direction of flying body 1 based on the inputted azimuth. The GPS sensor receives, from a plurality of GPS satellites, radio waves that include their respective transmission times, detects a latitude and a longitude of a radio wave reception point based on the plurality of transmission times included in the plurality of received radio waves, and outputs the latitude and the longitude of the radio wave reception point to machine body control unit 40. Machine body control unit 40 estimates the present position of flying body 1 based on the inputted latitude and longitude.

Machine body control unit 40 determines rotational speeds of eight respective motors 21 to 28 based on a predetermined machine body control program, the detection information inputted from sensor 41, and the operation information from a driver riding on body portion 2. In the exemplary embodiment, in a case where flying body 1 is an unmanned drone, in place of the operation information from the driver riding on body portion 2, at least one of operation information transmitted by a remote control and a predetermined automatic flight program is used.

Machine body control unit 40 generates command values to be set for eight respective motor drive units 31 to 38 based on the determined respective rotational speeds of eight motors 21 to 28. Machine body control unit 40 and eight respective motor drive units 31 to 38 are connected to each other by signal lines (not illustrated in the drawing). Machine body control unit 40 supplies the generated command values to eight respective motor drive units 31 to 38 via the respective signal lines. The command values may be wirelessly transmitted to eight respective motor drive units 31 to 38 from the machine body control unit 40 without using signal lines.

When machine body control unit 40 intends to move flying body 1 in any direction, machine body control unit 40 decreases a rotational speed of the motor disposed in the advancing direction, and increases a rotational speed of the motor disposed in a direction opposite to the advancing direction. With such a control, flying body 1 takes a forwardly inclined posture and hence, flying body 1 can move in the advancing direction.

Further, in flying body 1, the rotation directions of the motors disposed adjacently to each other are set opposite to each other. When machine body control unit 40 intends to rotate flying body 1 in any direction, machine body control unit 40 increases a rotational speed of the motor rotating in the direction opposite to the direction that flying body 1 is intended to rotate with respect to a rotational speed of the motor rotating in the same direction as the direction that flying body 1 is intended to be rotated. With such a control, a rotational force in the direction that flying body 1 is intended to be rotated is generated, and flying body 1 is rotated in the rotational direction.

The power supply system that is mounted on flying body 1 includes: eight power storage packs 51 to 58; sub power storage pack 59; eight first switches S11 to S18; eight second switches S21 to S28; DC/DC converter 60; and power supply control unit 70.

Eight power storage packs 51 to 58 are power supply devices for supplying a current to eight motor drive units 31 to 38 respectively. Sub power storage pack 59 is an auxiliary power supply device that can supply a current to the eight first current paths that are connected between eight motor drive units 31 to 38 and eight power storage packs 51 to 58, or can absorb a current from the eight first current paths.

Eight first switches S11 to S18 are respectively inserted into the eight second current paths that are connected between the eight first current paths and sub power storage pack 59. Sub power storage pack 59 can be electrically conductive with any current path out of the eight first current paths via eight first switches S11 to S18. Each of eight second switches S21 to S28 is inserted between a corresponding one of eight connecting points N1 to N8 on the eight first current paths to which the eight second current paths are connected, and a corresponding one of eight power storage packs 51 to 58. First switches S11 to S18 and second switches S21 to S28 may be configured using relays or semiconductor switches.

Distal ends of the eight second current paths near a sub power storage pack 59 are coupled into one line. DC/DC converter 60 is connected between node N9 and sub power storage pack 59. DC/DC converter 60 is a bidirectional DC/DC converter, and can control a charge voltage or a charge current when sub power storage pack 59 is charged and a discharge voltage or a discharge current when sub power storage pack 59 is discharged. A charging path that is connected to charge port P1 is also connected to node N9.

Power supply control unit 70 can be configured using a microcomputer and a nonvolatile memory. Power supply control unit 70 and eight power storage packs 51 to 58 are connected to each other by communication line 71. Power supply control unit 70 can adjust the balance of capacities among eight power storage packs 51 to 58 by controlling eight first switches S11 to S18 and eight second switches S21 to S28.

Figure 5:
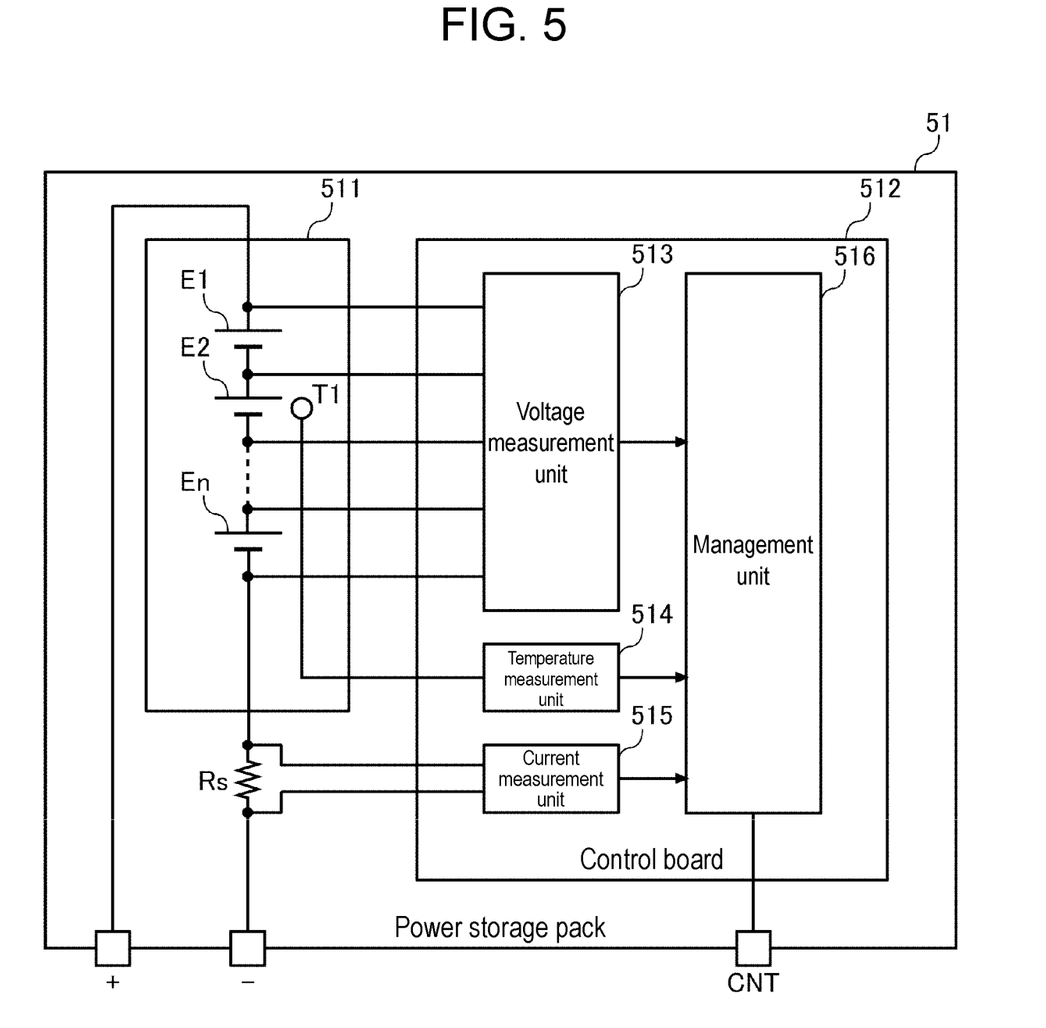
FIG. 5 is a diagram illustrating an example of an internal configuration of a power storage pack that is mounted on the flying body.

FIG. 5 is a diagram illustrating an example of an internal configuration of power storage pack 51 that is mounted on flying body 1. Power storage pack 51 includes power storage module 511 and control board 512. Power storage module 511 includes a plurality of cells $E_1$ to $E_n$ that are connected in series. Power storage module 511 may be configured such that a plurality of power storage modules are connected in series or are connected in series as well as in parallel with each other. As the cell, a lithium ion battery cell, a nickel metal hydride battery cell, a lead battery cell, an electric double layer capacitor cell, a lithium ion capacitor cell, or the like can be used. Hereinafter, in this specification, the description is made by assuming an example where a lithium ion battery cell (having a nominal voltage of 3.6 V to 3.7 V) is used as the cell. The number of cells $E_1$ to $E_n$ that are connected in series is determined in accordance with a drive voltage of motor 21.

Shunt resistor Rs is connected in series to the plurality of cells $E_1$ to $E_n$. Shunt resistor Rs functions as a current detection element. A Hall element may be used in place of shunt resistor Rs. In power storage module 511, temperature sensor T1 (for example, a thermistor) for detecting temperatures of the plurality of cells E1 to En is disposed. A plurality of temperature sensors T1 may be disposed.

Control board 512 is provided with voltage measurement unit 513, temperature measurement unit 514, current measurement unit 515, and management unit 516. Voltage measurement unit 513 is connected to the respective nodes of plurality of cells E1 to En, which are connected in series, by a plurality of voltage measurement lines. Voltage measurement unit 513 measures voltages of the respective cells E1 to En by measuring each voltage between two voltage measurement lines disposed adjacently to each other. Voltage measurement unit 513 transmits the measured voltages of cells E1 to En to management unit 516.

Voltage measurement unit 513 has a higher voltage than management unit 516 and hence, voltage measurement unit 513 and management unit 516 are connected in an insulated state by a communication line. Voltage measurement unit 513 can be configured using an application specific integrated circuit (ASIC) or a general-purpose analog front-end IC. Voltage measurement unit 513 includes a multiplexer and an A/D converter. The multiplexer outputs a voltage between two voltage measurement lines disposed adjacently to each other to the A/D converter in order from the top. The A/D converter converts an analog voltage inputted from the multiplexer into a digital value.

Temperature measurement unit 514 includes a voltage dividing resistor and an A/D converter. The A/D converter converts analog voltages that are obtained by division using temperature sensor T1 and the voltage dividing resistor into digital values, and outputs the digital values to management unit 516. Management unit 516 estimates the temperatures of the plurality of cells E1 to En based on the digital values.

Current measurement unit 515 includes a differential amplifier and an A/D converter. The differential amplifier amplifies a voltage across shunt resistor Rs and outputs the amplified voltage to the A/D converter. The A/D converter converts an analog voltage inputted from the differential amplifier into a digital value, and outputs the digital value to management unit 516. Management unit 516 estimates a current that flows through the plurality of cells E1 to En based on the digital value.

A case is considered where an A/D converter is mounted in management unit 516, and an analog input port is disposed in management unit 516. In this case, temperature measurement unit 514 and current measurement unit 515 may output an analog voltage to management unit 516, and the analog voltage may be converted into a digital value by the A/D converter in management unit 516.

Management unit 516 may be configured using a microcomputer and a nonvolatile memory. Management unit 516 manages states of the plurality of cells E1 to En based on the voltages, the temperatures, and the currents of the plurality of cells E1 to En that are measured by voltage measurement unit 513, temperature measurement unit 514, and current measurement unit 515.

Management unit 516 can estimate the SOCs and the SOHs of the plurality of cells E1 to En. Management unit 516 can estimate the SOCs using an open circuit voltage (OCV) method or a current integration method.

The SOH is defined as a ratio of a present full charge capacity (FCC) to an initial FCC, and the SOH having a lower value (closer to 0%) indicates that degradation progresses more. The SOH may be obtained by measuring a capacity through full charging or discharging, or may be obtained by summing up storage degradation and cycle degradation. The storage degradation can be estimated based on the SOC, the temperature, and a storage degradation rate. The cycle degradation can be estimated based on an SOC range in which the battery pack is used, a temperature, a current rate, and a cycle degradation rate. The storage degradation rate and the cycle degradation rate can be derived preliminarily by experiments or simulations. The SOC, the temperature, the SOC range, and the current rate can be obtained by measurement.

Further, the SOH can also be estimated based on a correlation between the SOH and an internal resistance of a cell. The internal resistance can be estimated by dividing a voltage drop that occurs when a predetermined current flows through the cell for a predetermined time by the current value. The internal resistance decreases as the temperature rises, and increases as the SOH decreases.

Power storage pack 51 includes, as external terminals, a positive-electrode terminal + that is connected to a positive electrode of power storage module 511, a negative-electrode terminal − that is connected to a negative electrode of power storage module 511, and control terminal CNT that is connected to control board 512. Communication line 71 is connected to control terminal CNT. Management unit 516 transmits monitoring data of the plurality of cells E1 to En to power supply control unit 70 for every predetermined period via communication line 71. Voltages, temperatures, and currents of the plurality of cells E1 to En are transmitted as the monitoring data. With respect to the SOC and the SOH, management unit 516 may estimate the SOC and the SOH and transmit the SOC and the SOH to power supply control unit 70, or may estimate the SOC and the SOH based on the voltage, the temperature, and the current received by the power supply control unit 70.

As a communication protocol between eight power storage packs 51 to 58 and power supply control unit 70, for example, an RS-485, a TCP/IP, a controller area network (CAN), or the like can be used. Eight power storage packs 51 to 58 and power supply control unit 70 may be connected to each other through wireless communication or power line communication.

Figure 6:
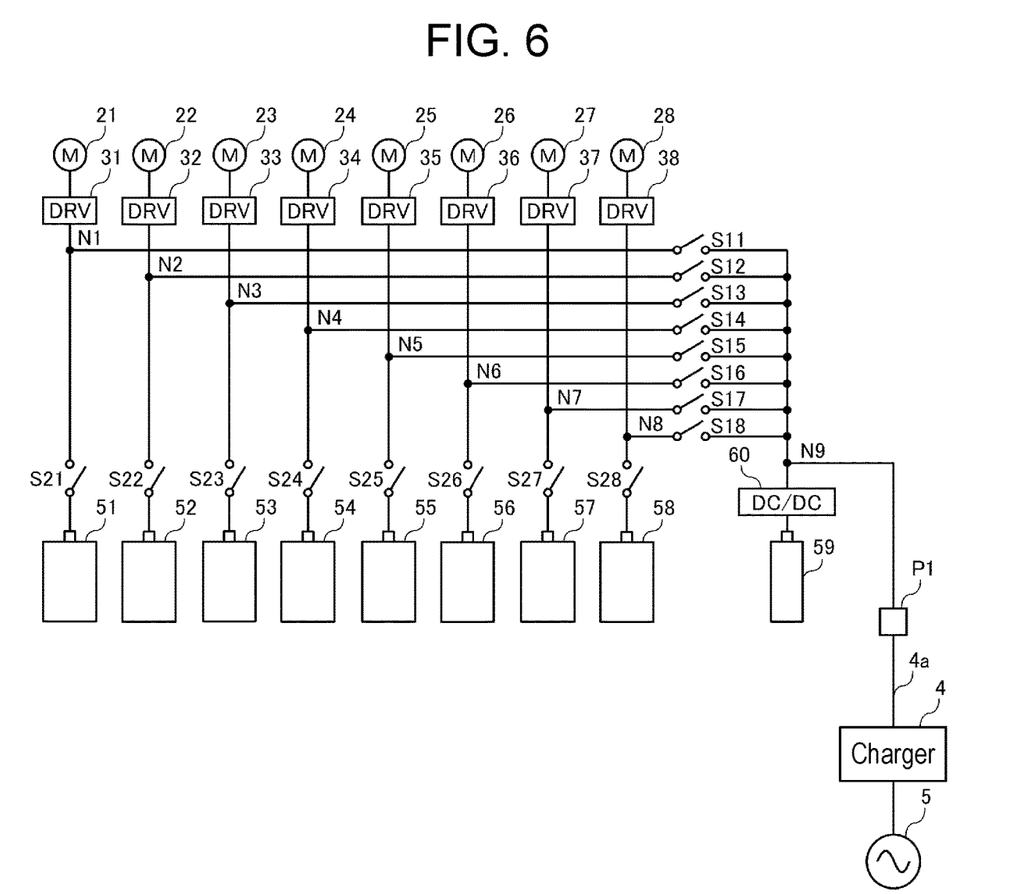
FIG. 6 is a diagram illustrating a connection state of eight power storage packs that are mounted on the flying body at a time of charging.

FIG. 6 is a diagram illustrating a connection state of eight power storage packs 51 to 58 mounted on flying body 1. It is possible to charge eight power storage packs 51 to 58 and sub power storage pack 59 from charger 4 installed outside by inserting charging cable 4a into the charge port P1. In the present exemplary embodiment, charger 4 is assumed to be a quick charger having a power conversion function of converting three-phase AC power supplied from commercial power system 5 into DC power. Charger 4 generates DC power by performing full-wave rectifying of AC power supplied from commercial power system 5, and by smoothing the rectified AC power by a filter.

Before starting charging first power storage pack 51 to eighth power storage pack 58, power supply control unit 70 controls DC/DC converter 60 to charge sub power storage pack 59 in order to prevent an inrush current. Thereafter, power supply control unit 70 turns on 1.1th switch S11 and 2.1th switch S21 to charge first power storage pack 51 from charger 4. At the time of performing such charging, sub power storage pack 59 acts as capacity for smoothing the charge voltage.

When the charging of first power storage pack 51 is completed, power supply control unit 70 turns off 1.1th switch S11 and 2.1th switch S21, and then turns on 1.2th switch S12 and 2.2th switch S22 to charge second power storage pack 52 from charger 4. Hereinafter, in the same manner as described above, the charging is sequentially performed up to eighth power storage pack 58.

Power supply control unit 70 may control all of 1.1th switch S11 to 1.8th switch S18 and 2.1th switch S21 to 2.8th switch S28 to an ON state to simultaneously charge first power storage pack 51 to eighth power storage pack 58. Power storage packs may be charged such that two power storage packs are simultaneously charged each time and such charging is sequentially performed. Alternatively, power storage packs may be charged such that four power storage packs are simultaneously charged each time and such charging is sequentially performed. The number of power storage packs that are rechargeable simultaneously depends on the specifications of components of the power supply system.

When charger 4 is a normal-type charger, the power storage packs are charged with single-phase 100/200 V AC power. When the power storage packs are charged with an alternating current, an AC/DC converter (not illustrated in the drawing) is inserted into a current path between node N9 and charge port P1. The AC/DC converter converts AC power inputted from charger 4 into DC power and outputs the DC power toward node N9.

Figure 7:
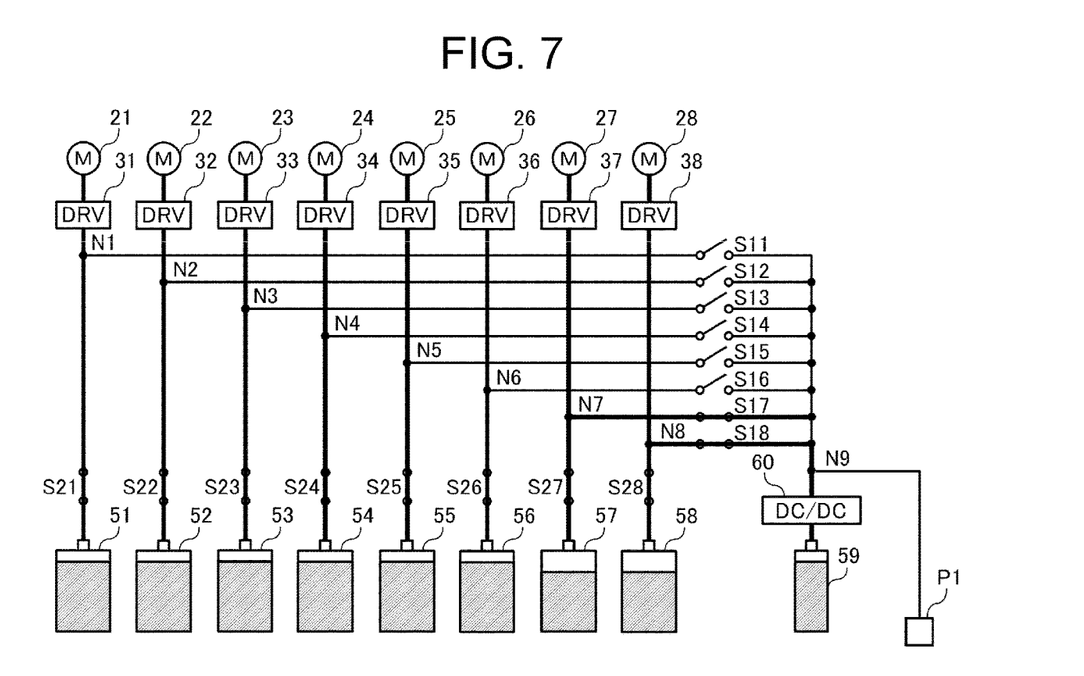
FIG. 7 is a diagram illustrating an example of a state of the power supply system during a flight of the flying body.

FIG. 7 is a diagram illustrating an example of a state of the power supply system during a flight of flying body 1. As described above, when flying body 1 advances forward, it is necessary to increase the rotational speeds of fifth motor 25 to eighth motor 28 than the rotational speeds of first motor 21 to fourth motor 24. Further, when flying body 1 advances leftward and forward, it is necessary to increase the rotational speeds of seventh motor 27 and eighth motor 28 than rotational speeds of first motor 21 to sixth motor 26.

FIG. 7 is a diagram illustrating an example of a state of the power supply system when flying body 1 advances leftward and forward. When flying body 1 advances leftward and forward, it is necessary to increase the rotational speeds of seventh motor 27 and eighth motor 28. Accordingly, the power consumption of seventh motor 27 and eighth motor 28 becomes larger than the power consumption of first motor 21 to sixth motor 26. That is, loads of seventh motor 27 and eighth motor 28 become larger than loads of first motor 21 to the sixth motor 26. In this case, the SOCs of seventh power storage pack 57 and eighth power storage pack 58 are decreased earlier than the SOCs of first power storage pack 51 to sixth power storage pack 56.

In the example illustrated in FIG. 7, power supply control unit 70 controls 1.7th switch S17 and 1.8th switch S18 that are inserted into the second current path connected to seventh motor 27 and eighth motor 28 that have the larger power consumption than first motor 21 to sixth motor 26 to an ON state. On the other hand, power supply control unit 70 maintains 1.1th switch S11 to 1.6th switch S16 that are inserted into the second current path connected to first motor 21 to sixth motor 26 in an OFF state. With such an operation, an auxiliary current is supplied only to seventh motor 27 and eighth motor 28 from sub power storage pack 59. Accordingly, the decrease of the SOCs of seventh power storage pack 57 and eighth power storage pack 58 is alleviated.

Hereinafter, an ON/OFF control of the first switch that is inserted into the second current path connected to the motor having larger power consumption than other motors is described in detail. Basically, the following processing is executed in a state where the irregularities in power consumption among first power storage pack 51 to eighth power storage pack 58 exceed a predetermined value.

Power supply control unit 70 specifies at least one power storage pack having a higher current value than other power storage packs based on respective current values of first power storage pack 51 to eighth power storage pack 58 received from first power storage pack 51 to eighth power storage pack 58. Power supply control unit 70 calculates an overcurrent value of the specified power storage pack. In the example illustrated in FIG. 7, power supply control unit 70 calculates a whole overcurrent value by summing an overcurrent value of seventh power storage pack 57 and an overcurrent value of eighth power storage pack 58. Power supply control unit 70 determines a current command value of DC/DC converter 60 such that an output current value of DC/DC converter 60 becomes the overcurrent value. Power supply control unit 70 sets the determined current command value in DC/DC converter 60 so as to operate DC/DC converter 60, and turns on 1.7th switch S17 to 1.8th switch S18. When the irregularities in the respective current values of first power storage pack 51 to eighth power storage pack 58 fall within the predetermined value, power supply control unit 70 stops DC/DC converter 60, and turns off 1.7th switch S17 to 1.8th switch S18.

Further, power supply control unit 70 may perform an ON/OFF control of the first switch as follows. Power supply control unit 70 acquires the rotational speeds of first motor 21 to eighth motor 28 from machine body control unit 40. Power supply control unit 70 specifies at least one power storage pack having a higher rotational speed than other power storage packs based on the acquired respective rotational speeds. Power supply control unit 70 calculates an overcurrent value corresponding to the excessive rotational speed of the specified power storage pack. In the example illustrated in FIG. 7, power supply control unit 70 calculates a whole overcurrent value by summing an overcurrent value of seventh power storage pack 57 and an overcurrent value of eighth power storage pack 58. Hereinafter, substantially the same processing described above is executed.

Further, power supply control unit 70 may perform an ON/OFF control of the first switch as follows. Power supply control unit 70 specifies at least one power storage pack having a smaller voltage value than other power storage packs based on respective voltage values received from first power storage pack 51 to eighth power storage pack 58. Power supply control unit 70 determines a voltage command value of DC/DC converter 60 such that an output voltage value of DC/DC converter 60 becomes higher than the voltage value of the specified power storage pack. Power supply control unit 70 sets the determined voltage command value in DC/DC converter 60 so as to operate DC/DC converter 60, and turns on 1.7th switch S17 to 1.8th switch S18. When the irregularities in the voltage values or the SOCs of first power storage pack 51 to eighth power storage pack 58 fall within the predetermined value, power supply control unit 70 stops DC/DC converter 60, and turns off 1.7th switch S17 to 1.8th switch S18.

Figure 8:
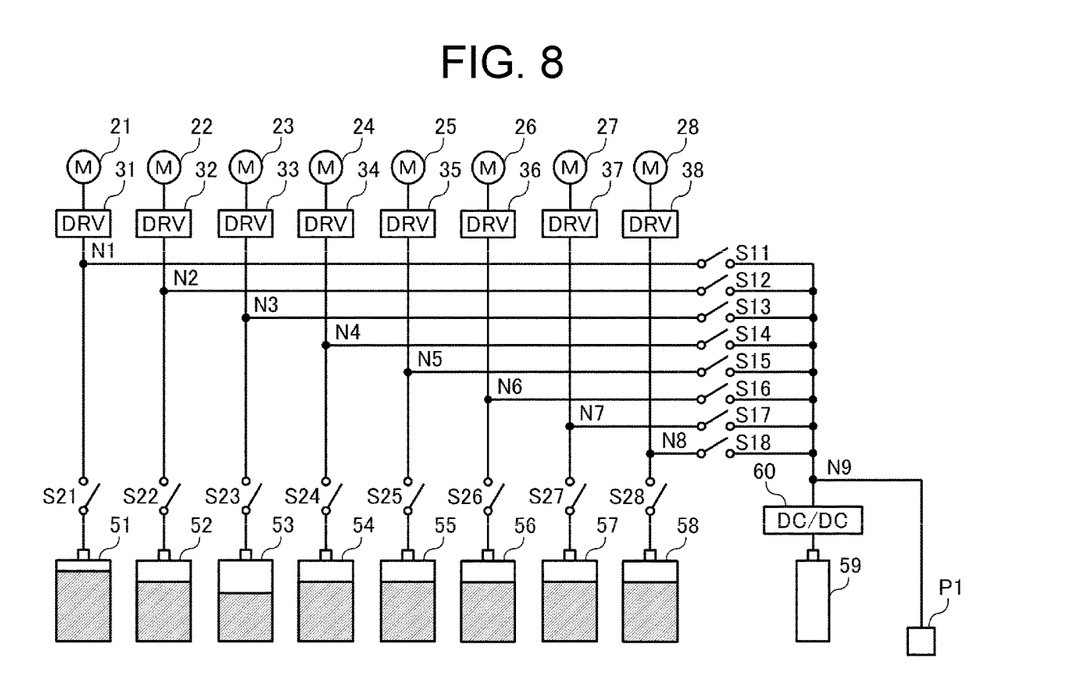
FIG. 8 is a diagram for explaining an example of equalization processing of capacities among a first power storage pack to an eighth power storage pack during parking of the flying body (part 1).
Figure 9:
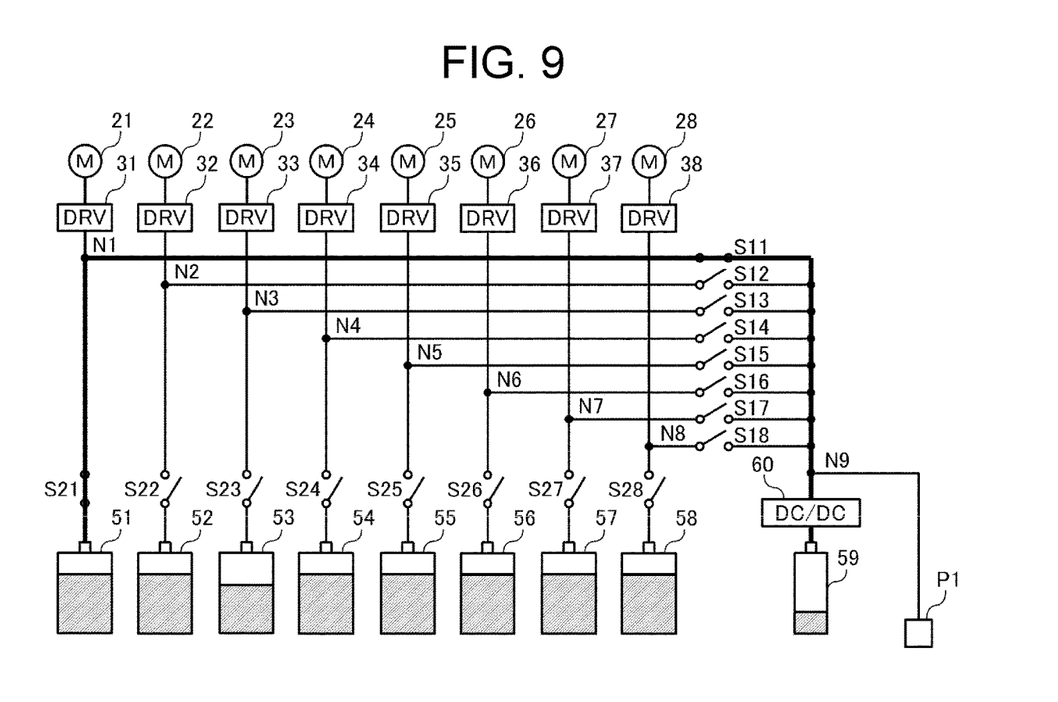
FIG. 9 is a diagram for explaining an example of the equalization processing of capacities among the first power storage pack to the eighth power storage pack during parking of the flying body (part 2).
Figure 10:
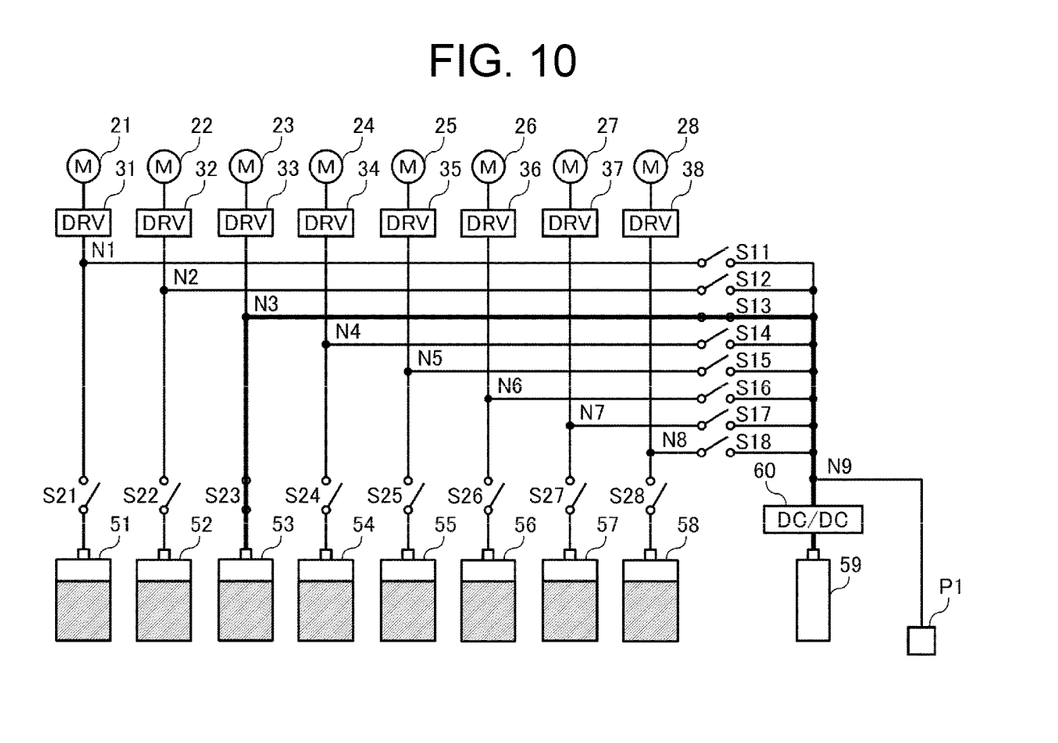
FIG. 10 is a diagram for explaining an example of the equalization processing of capacities among the first power storage pack to the eighth power storage pack during parking of the flying body (part 3).

FIG. 8 to FIG. 10 are block diagrams for explaining an example of equalization processing for equalizing capacities among first power storage pack 51 to eighth power storage pack 58 during parking of flying body 1. In this example, it is assumed a state where flying body 1 temporarily parks at a place where no charger 4 exists. During the temporary parking of flying body 1, power supply control unit 70 equalizes the capacities among first power storage pack 51 to eighth power storage pack 58 by an active balance method.

For example, power supply control unit 70 calculates an average value of the voltages of first power storage pack 51 to eighth power storage pack 58 received from first power storage pack 51 to eighth power storage pack 58, and sets the calculated average value to an equalization target voltage (hereinafter, simply referred to as a target voltage).

Power supply control unit 70 transfers energy from the power storage pack having a voltage higher than the target voltage (first power storage pack 51 in FIG. 8) to the power storage pack having a voltage lower than the target voltage (third power storage pack 53 in FIG. 8). First, as illustrated in FIG. 9, power supply control unit 70 controls 1.1th switch S11 and 2.1th switch S21 to an ON state, and charges sub power storage pack 59 from first power storage pack 51 until the voltage of first power storage pack 51 is decreased to the target voltage. When the voltage of first power storage pack 51 is lower than the voltage of sub power storage pack 59, power supply control unit 70 controls DC/DC converter 60 so as to increase the voltage of first power storage pack 51.

Next, as illustrated in FIG. 10, power supply control unit 70 controls 1.3th switch S13 and 2.3th switch S23 to an ON state, and charges third power storage pack 53 from sub power storage pack 59 until the voltage of third power storage pack 53 is increased to the target voltage. When the voltage of sub power storage pack 59 is lower than the voltage of third power storage pack 53, power supply control unit 70 controls DC/DC converter 60 to increase the voltage of sub power storage pack 59.

Power supply control unit 70 repeatedly performs the above-mentioned processing until the voltages of first power storage pack 51 to eighth power storage pack 58 are all equalized. In the description made above, the example where the voltage is used as the equalization target value is described. However, an SOC, an actual capacity, a dischargeable capacity, or a rechargeable capacity may be used instead of the voltage.

Even in a case where there is no substantial irregularities in capacity among first power storage pack 51 to eighth power storage pack 58, when the SOCs of first power storage pack 51 to eighth power storage pack 58 are lowered to a set value or below, power supply control unit 70 may charge first power storage pack 51 to eighth power storage pack 58 from sub power storage pack 59.

By the way, there may be a case where a failure occurs in at least one of first power storage pack 51 to eighth power storage pack 58. When the supply of a current from the power storage pack in which the failure has occurred to the corresponding motor is stopped, it becomes difficult to control the posture of flying body 1. To cope with such a drawback, power supply control unit 70 controls the second switch inserted into the first current path connected to the power storage pack in which a failure has occurred on an OFF state, and controls the first switch inserted into the second current path connected to the power storage pack to an ON state. With such a control, it is possible to continue the supply of a current from sub power storage pack 59 to the motor. That is, sub power storage pack 59 functions as a power storage pack that substitutes for the power storage pack in which a failure has occurred.

In the present exemplary embodiment, a rated output of sub power storage pack 59 is set to a value corresponding to rated outputs of first power storage pack 51 to eighth power storage pack 58. As described above, there is the case where sub power storage pack 59 is used as a substitute for at least one of first power storage pack 51 to eighth power storage pack 58. Accordingly, sub power storage pack 59 is required to possess the output performance substantially equal to the output performances of first power storage pack 51 to eighth power storage pack 58.

The capacity of sub power storage pack 59 is designed to be smaller than the capacities of first power storage pack 51 to eighth power storage pack 58. It is desirable that sub power storage pack 59 have large capacity from a viewpoint of securing backup capacity and securing a buffer region. However, when sub power storage pack 59 has large capacity, a weight of sub power storage pack 59 is increased, and the increase of the weight of sub power storage pack 59 becomes a factor that lowers an economy of electricity of flying body 1. In the present exemplary embodiment, the priority is assigned to the economy of electricity of flying body 1. Accordingly, the capacity of sub power storage pack 59 is designed to be smaller than the capacities of first power storage pack 51 to eighth power storage pack 58.

As described above, according to the present exemplary embodiment, flying body 1 includes the plurality of power storage packs 51 to 58 and sub power storage pack 59. Accordingly, even when an abnormality occurs in any one of the power storage packs during flight, a stable flight can be continued by switching the power storage pack in which the abnormality has occurred to sub power storage pack 59. Accordingly, safety during flight can be improved, and this also contributes to the practical use of a manned drone.

Since sub power storage pack 59 is installed at the center-of-gravity portion of the machine body, the weight of the machine body can be made uniform longitudinally and laterally. This makes it possible to prevent the posture of the machine body from becoming an unsafe point. Further, it is possible to prevent the load from being biased to a specific motor, and it is possible to prevent an SOH of a specific power storage pack from lowering faster than the others.

As illustrated in FIG. 1, when sub power storage pack 59 is installed in the central portion of the machine body, the power wirings connecting sub power storage pack 59 and each of first power storage pack 51 to eighth power storage pack 58 can be made uniform and shortest. Since the power wirings are made uniform, the wiring resistances become equal, and the voltage drops due to the wiring resistances become uniform among first power storage pack 51 and eighth power storage pack 58. As a result, the accuracy of voltage measurement of first power storage pack 51 to eighth power storage pack 58 is improved, and the accuracy of equalization per unit time is also improved.

As illustrated in FIG. 3, even when sub power storage pack 59 is installed at a position shifted from the central portion of the machine body, the same effects as described above can be obtained by connecting sub power storage pack 59 to first power storage pack 51 to eighth power storage pack 58 such that the wiring resistances become equal.

When a substrate on which electrical components (such as relays) of the power supply system is disposed in the vicinity of sub power storage pack 59, the wiring resistances between sub power storage pack 59 and each of first power storage pack 51 to eighth power storage pack 58 can be made more strictly uniform. Further, it is possible to prevent the weight of the substrate from adversely affecting balance of the machine body.

Further, the irregularities in the decrease of SOC among first power storage pack 51 to eighth power storage pack 58 can be suppressed by supplying an auxiliary current from sub power storage pack 59 to the motor having a high rotational speed during the flight. As a result, the number of charge/discharge cycles among first power storage pack 51 to eighth power storage pack 58 can be made uniform. Accordingly, the irregularities in the decrease of SOH among first power storage pack 51 to eighth power storage pack 58 can be suppressed. Accordingly, the replacement timing can be made equal among first power storage pack 51 to eighth power storage pack 58. Such an advantageous effect also contributes to the reduction of an operation cost of the power storage packs.

Further, the capacities of first power storage pack 51 to eighth power storage pack 58 can be effectively and maximally utilized by equalizing the capacities of first power storage pack 51 to eighth power storage pack 58 by the active balance method during the temporary parking of flying body 1. That is, it is possible to prevent the actual flight distance from becoming shorter than a flyable distance that flying body 1 can originally fly with the whole capacity of first power storage pack 51 to eighth power storage pack 58. Further, it is possible to efficiently perform the equalization by the active balance method by utilizing sub power storage pack 59 as a buffer. Since a surplus capacity generated in the equalization performed by the active balance method can be charged to sub power storage pack 59, it is possible to effectively utilize the surplus capacity unlike a case where the equalization is performed in a passive balance method where a surplus capacity is discarded.

At the time of performing the equalization processing by the active balance method, electricity is charged from the power storage pack having high SOC to the power storage pack having low SOC via DC/DC converter 60 and sub power storage pack 59. With such an operation, it is possible to appropriately control an equalizing current without connecting a DC/DC converter to each of first power storage pack 51 to eighth power storage pack 58. At the time of performing the equalization processing by the active balance method, it is also possible to prevent an inrush current from flowing from the power storage pack having a high SOC to the power storage pack having a low SOC. Accordingly, the cost can be reduced while ensuring the safety.

Further, a charging operation to charge first power storage pack 51 to eighth power storage pack 58 can be simplified by coupling a plurality of buses that are connected between the respective first to eighth power storage packs 51 to 58 and sub power storage pack 59, and by supplying electricity to node N9 of the plurality of buses from the outside. When the respective first to eighth power storage packs 51 to 58 are charged from the outside, an operation of inserting a charging cable 4a eight times becomes necessary. However, it is sufficient to perform such an operation only once in the present exemplary embodiment. Further, it is possible to allow sub power storage pack 59 to function as a smoothing capacity at the time of charging and hence, the inrush current that may occur at the time of starting charging can be suppressed.

The present disclosure has been described above in accordance with the exemplary embodiment. It will be understood by the person of ordinary skill in the art that the exemplary embodiment is merely an example, other modified examples in which configuration elements and processing processes of the exemplary embodiment are variously combined are possible, and the other modified examples still fall within the scope of the present disclosure.

For example, first power storage pack 51 to eighth power storage pack 58 may be configured detachably from the machine body. In this case, the power storage pack can be detached from the machine body and charged. Further, the power storage pack can be replaced with a charged power storage pack of the same type. In this case, the charging time can be saved.

In the above-mentioned exemplary embodiment, the example in which sub power storage pack 59 is installed at the center-of-gravity portion of flying body 1 has been described. In this respect, sub power storage pack 59 can also be used to adjust the position of the center of gravity in the longitudinal direction on lateral center line L1 of flying body 1. For example, sub power storage pack 59 may be installed in front of the position of the center of gravity in a state where sub power storage pack 59 is not installed in order to make the position of the center of gravity in the state where sub power storage pack 59 is not installed to be shifted forward. Similarly, sub power storage pack 59 may be installed at the rear of the position of the center of gravity in a state where sub power storage pack 59 is not installed in order to make the position of the center of gravity in the state where sub power storage pack 59 is not installed to be shifted rearward.

In the above-mentioned exemplary embodiment, the description has been made with respect to flying body 1 that includes eight propellers 11 to 18. In this respect, the number of propellers is not limited to eight. For example, the number of propellers may be 4, 6, or 12.

The exemplary embodiment may be specified by the following items.

[Item 1]

Flying body (1) including body portion (2) and a plurality of propellers (11 to 18) radially disposed to be laterally symmetrical from body portion (2): flying body (1) provided with:
- a plurality of motors (21 to 28) respectively rotating the plurality of propellers (11 to 18);
- a plurality of power storage packs (51 to 58) respectively supplying currents to the plurality of motors (21 to 28); and
- sub power storage pack (59) connected to the plurality of power storage packs (51 to 58) by power wirings (H11 to H18), respectively,
- wherein the same number of motors of the plurality of motors (21 to 28) are installed on each of the left and right sides, and the same number of power storage packs of the plurality of power storage packs (51 to 58) are installed on each of the left and right sides, and
- sub power storage pack (59) is installed on a lateral center line of body portion (2).

This makes it possible to effectively utilize capacities of the plurality of power storage packs (51 to 58) while suppressing an effect on balance of a machine body.

[Item 2]

Flying body (1) according to item 1, wherein sub power storage pack (59) is installed at a center-of-gravity portion of flying body (1).

This makes it possible to suppress an adverse effect on the balance of the machine body caused by the installation of sub power storage pack (59).

[Item 3]

Flying body (1) according to Item 1 or 2, wherein sub power storage pack (59) is connected to the plurality of power storage packs (51 to 58) by the power wiring (H11 to H18), respectively, with wiring resistances being equal between sub power storage pack (59) and the plurality of power storage packs (51 to 58).

This makes it possible to improve the accuracy of measurement of voltages of the plurality of power storage packs (51 to 58).

[Item 4]

Flying body (1) according to any one of items 1 to 3, wherein
- the plurality of power storage packs (51 to 58) are disposed to be distributed at equal distances laterally from the center line of body portion (2), and power wirings (H11 to H18) respectively connecting sub power storage pack (59) to the plurality of power storage packs (51 to 58) are set to have an equal length.

This makes it possible to equalize wiring resistances of power wirings (H11 to H18) while suppressing the effect on the balance of the machine body.

[Item 5]

Flying body (1) according to any one of items 1 to 4, wherein a capacity of sub power storage pack (59) is smaller than capacities of the plurality of power storage packs (51 to 58).

With such a configuration, it is possible to suppress an increase in weight of flying body (1) thus suppressing lowering of economy of electricity of flying body (1).

REFERENCE MARKS IN THE DRAWINGS

1: flying body
2: body portion
11-18: propeller
21-28: motor
A1-A4: arm
X4: support shaft
H8, H11-H18: wire harness
38: motor drive unit
40: machine body control unit
41: sensor
51-58: power storage pack
59: sub power storage pack
511: power storage module
E1-En: cell
Rs: shunt resistor
T1: temperature sensor
512: control board
513: voltage measurement unit
514: temperature measurement unit
515: current measurement unit
516: management unit
60: DC/DC converter
70: power supply control unit
71: communication line
S11-S18: first switch
S21-S28: second switch
P1: charge port
4: charger
4a: charging cable
5: commercial power system

The invention claimed is:

1. A flying body comprising: a body portion; a plurality of propellers which are radially disposed and are laterally symmetrical from the body portion; a plurality of motors, each of which rotates a respective one of the plurality of propellers; a plurality of power storage packs, each of which supplies currents to a respective one of the plurality of motors, respectively; a sub power storage pack connected to each of the plurality of power storage packs by a respective one of power wirings, a plurality of switches disposed between the plurality of power storage packs and the sub power storage pack, respectively; and a power supply control unit that includes a microcomputer and controls the plurality of switches, wherein: the sub power storage pack is installed on a lateral center line of the body portion, and a same number of motors of the plurality of motors are installed on each of a left side and a right side of a lateral center line of the sub power storage pack, and a same number of power storage packs of the plurality of power storage packs are installed on each of the left side and the right side, and the power supply control unit specifies at least one power storage pack having a higher current value than other power storage packs, having a corresponding motor having a higher rotational speed than other motors, or having a smaller voltage value than other power storage pack, and turns on at least one of the plurality of switches corresponding to at least one power storage pack to supply an auxiliary current from the sub power storage pack to the at least one power storage pack.

2. The flying body according to claim 1, wherein the sub power storage pack is installed at a center-of-gravity portion of the flying body.

3. The flying body according to claim 1, wherein:
the sub power storage pack is connected to each of the plurality of power storage packs by a respective one of the power wirings, and
wiring resistances of the power wirings are equal between the sub power storage pack and the plurality of power storage packs.

4. The flying body according to claim 1, wherein:
the plurality of power storage packs are distributed at equal distances laterally from the lateral center line of the body portion, and
the power wirings each connecting the sub power storage pack to a respective one of the plurality of power storage packs are set to have an equal length.

5. The flying body according to claim 1, wherein the sub power storage pack includes a capacity that is smaller than capacities of the plurality of power storage packs.

6. The flying body according to claim 5, wherein the sub power storage pack has an equal output performance to the plurality of power storage packs.

7. The flying body according to claim 1, further comprising a DC-DC convertor disposed between the plurality of switches and the sub power storage pack.

* * * * *